United States Patent [19]
Phillippi et al.

[11] Patent Number: 4,746,534
[45] Date of Patent: May 24, 1988

[54] METHOD OF MAKING A THERMOCOUPLE

[75] Inventors: R. Michael Phillippi, Highland, Md.; David C. Greenspan, Vienna, Va.; Richard T. Ellis, Columbia; Tadeusz M. Drzewiecki, Silver Spring, both of Md.; Taki Negas, Frederick, Md.; Ernie Tokay, Reston; James R. Bush, Alexandria, both of Va.

[73] Assignee: System Planning Corporation, Arlington, Va.

[21] Appl. No.: 119,122

[22] Filed: Nov. 10, 1987

Related U.S. Application Data

[62] Division of Ser. No. 775,183, Sep. 12, 1985, Pat. No. 4,721,534.

[51] Int. Cl.$^4$ ............................................. B05D 3/06
[52] U.S. Cl. ........................................ 427/37; 427/38; 427/124; 427/126.3; 427/126.4
[58] Field of Search ............... 427/37, 38, 124, 126.3, 427/126.4

[56] References Cited

U.S. PATENT DOCUMENTS

| | | | |
|---|---|---|---|
| 2,303,704 | 12/1942 | Oseland | 136/4 |
| 2,843,646 | 7/1958 | Conant | 136/4 |
| 3,061,482 | 10/1962 | Grant | 148/6 |
| 3,106,493 | 10/1963 | Japka | 136/4 |
| 3,148,981 | 9/1964 | Ryshkewitch | 75/206 |
| 3,250,125 | 5/1966 | Bonn | 73/343 |
| 3,379,578 | 4/1968 | McTaggart et al. | 136/234 |
| 3,505,101 | 4/1970 | Koffskey, Jr. et al. | 117/105.2 |
| 3,530,716 | 9/1970 | Truppe et al. | 73/343 |
| 3,537,911 | 11/1970 | Hynd | 136/242 |
| 3,647,560 | 3/1972 | Truppe et al. | 136/234 |
| 3,652,068 | 3/1972 | Truppe et al. | 263/50 |
| 3,975,165 | 8/1976 | Elbert et al. | 29/182.2 |
| 4,060,095 | 11/1977 | Kurita | 136/234 |
| 4,135,538 | 1/1979 | Kurita | 136/234 |
| 4,141,743 | 2/1979 | Grubba | 106/66 |
| 4,216,028 | 8/1980 | Kurita | 136/234 |

OTHER PUBLICATIONS

Phillippi et al, "Design of a Fluidic Capillary Pyrometer for Contact Duty at Temperatures to 2750°, 1982, *Temperature Its Measurement & Control*, vol. 5, pp. 1345-1351.

Negas et al, "Fabrication, Testing and Evaluation of Prototype Fluidic Capillary Pyrometer Systems", *Journal of Dynamic Systems, Measurement and Control*, Dec. 1981, vol. 103, pp. 309-315.

*Primary Examiner*—Bernard D. Pianalto
*Attorney, Agent, or Firm*—Pollock, Vande Sande & Priddy

[57] ABSTRACT

A protective sheath for a temperature sensing device for use in determining the temperature of molten metals. The temperature sensing device, such as a thermocouple, is encased in a molybdenum tube which is coated with successive porous layers of molybdenum, a plurality of layers of $Al_2O_3$-$Cr_2O_3$-Mo in a decreasing concentration of Mo in proceeding from the inner to the outer layers, and a layer of substantially pure $Al_2O_3$-$Cr_2O_3$. The $Al_2O_3$-$Cr_2O_3$ layer may be covered with an outer coating of a material, such as boron nitride, to protect the $Al_2O_3$-$Cr_2O_3$ layer from attack by slag. Alternating layers of $Al_2O_3$-$Cr_2O_3$ and boron nitride may be applied as outermost sacrificial layers.

2 Claims, 3 Drawing Sheets

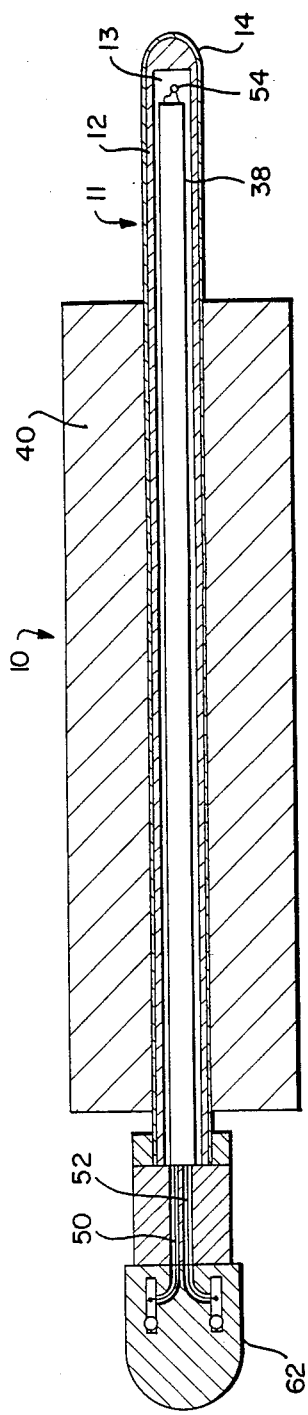
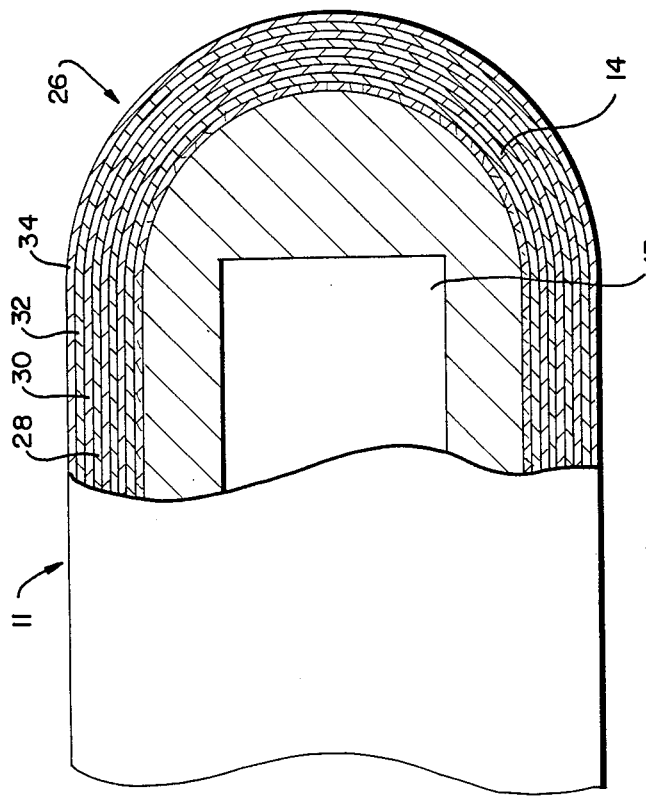
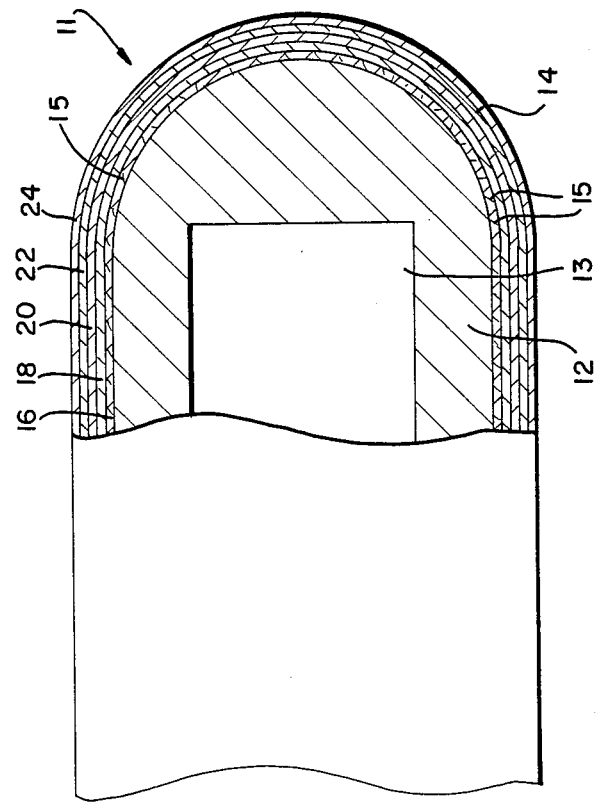

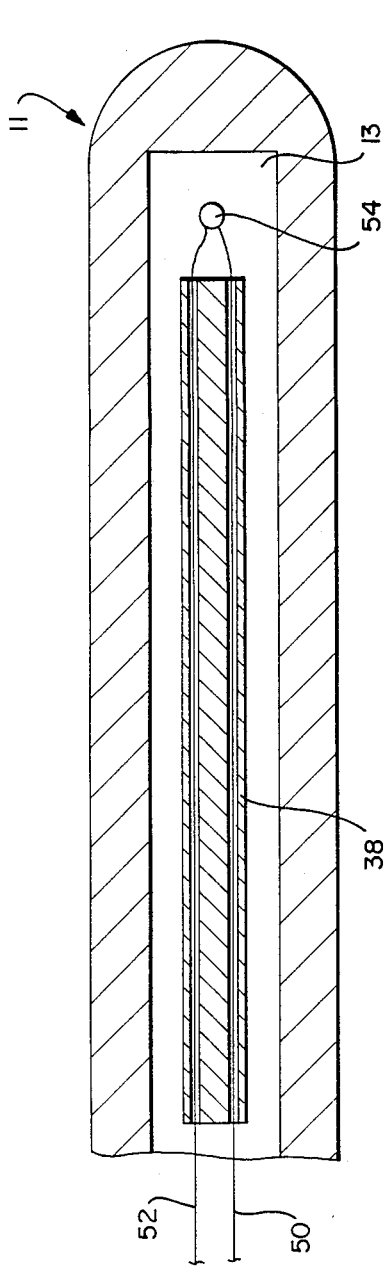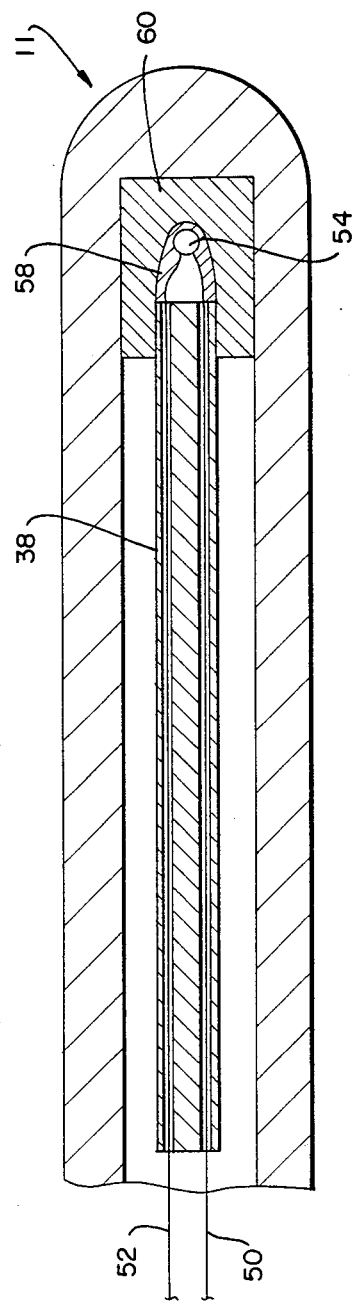

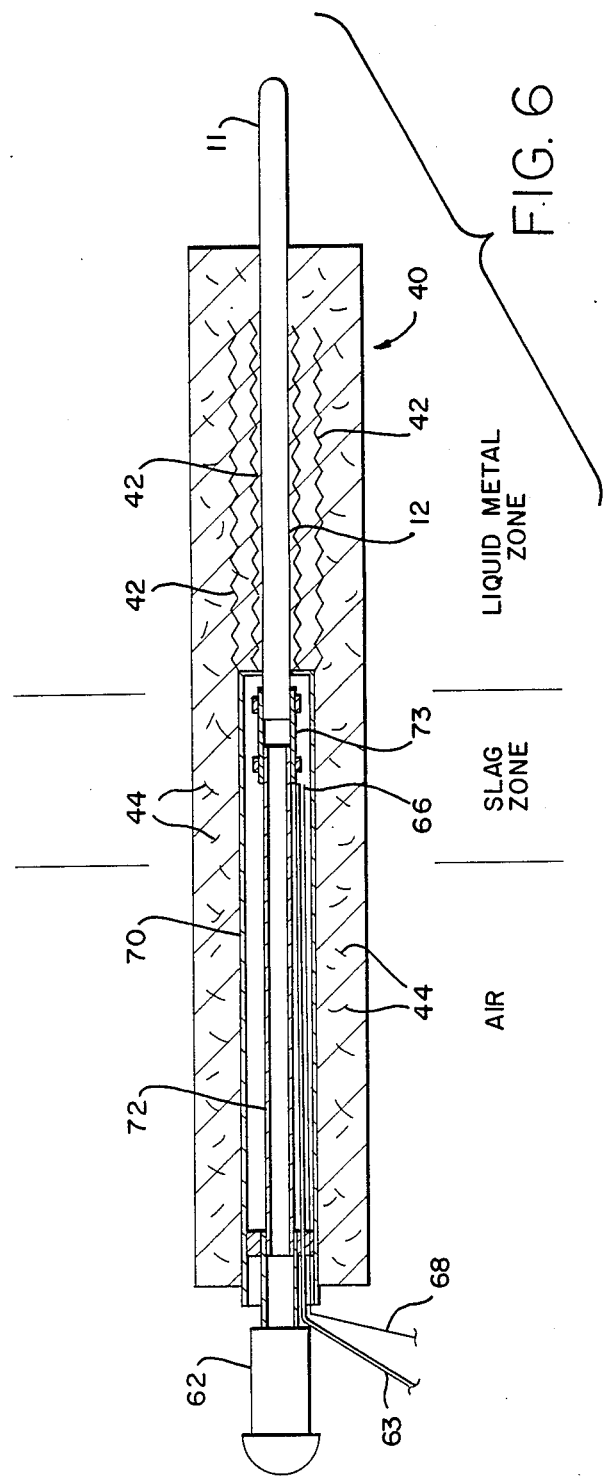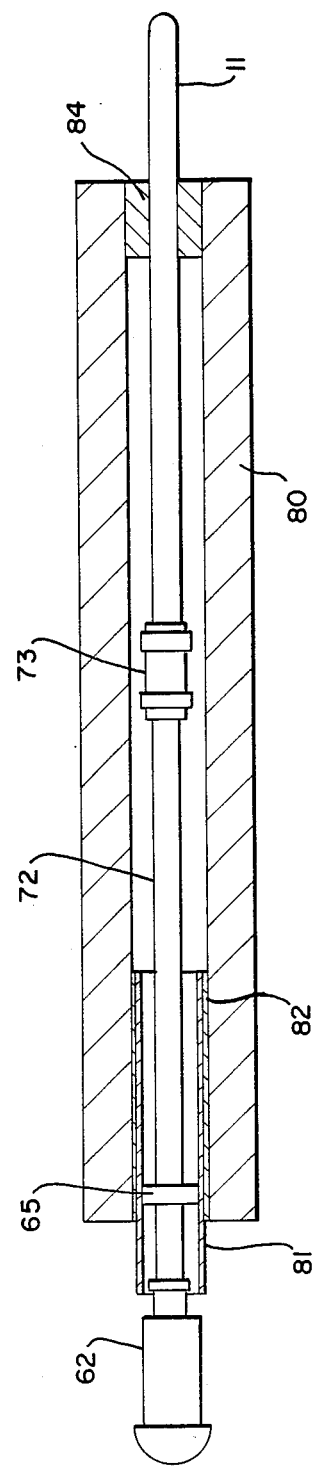

METHOD OF MAKING A THERMOCOUPLE

This is a divisional of co-pending application Ser. No. 775,183 filed on Sept. 12, 1985 now U.S. Pat. No. 4,721,534.

BACKGROUND OF THE INVENTION

This invention relates to a protective sheath for a temperature sensing device, as for example a thermocouple, which has a long performance lifetime under conditions in which either continuous or intermittent measurements are made of the temperatures of molten metals.

Many industrial and scientific processes require the measurement and control of extremely high temperatures. For example, measurements of the temperature of molten metals are essential to proper process control in the metal processing industry. Two of the most common instruments used to determine the temperature of molten metals are the optical pyrometer and the disposable lance thermocouple. However, each of these devices has disadvantages. The optical pyrometer is not as accurate as is desirable, and can measure only the surface temperature of the molten metal. The disposable lance thermocouple is inaccurate, does not permit continuous measurement of the temperature of the molten metal, and its use involves some safety problems for the person using it.

As a result of the shortcomings of the optical pyrometer and the disposable lance thermocouple, considerable effort has been expended to develop an immersion pyrometer with a long-term continuous reading capability. In one type of an immersion pyrometer a thermocouple junction is encased in a tube made of a metal with a high melting temperature which is coated with a ceramic, such as $Al_2O_3$ or a mixture of $Al_2O_3$ and $Cr_2O_3$ which protects the metal tube itself from the molten metal environment. However, in use the ceramic layer or layers tended to spall as a result of large cracks caused by differences in coefficients of thermal expansion. This permitted molten metal to contact the metal substrate and attack it. Attempts were made to overcome the spalling tendency by matching as closely as possible the coefficients of thermal expansion of contiguous layers and by densifying the layers. These attempts included the use of small changes in compositions in proceeding from one layer to the next layer (grading), and densifying the layers as by sintering. Commercially useful protective sheaths for thermocouples have been made by these and other methods; however, immersion pyrometers having a longer lifetime are desirable.

SUMMARY OF THE INVENTION

It is accordingly one object of this invention to provide a protective sheath for a temperature sensing device which enables it to be used for extended periods of time in a molten metal environment.

It is still another object of this invention to provide a protective sheath for a thermocouple which will be resistant to thermal shock and be capable of withstanding successive cycles of rapid heating and cooling such as are experienced in insertion into and removal of the thermocouple from molten metal.

It is still another object to provide a thermocouple system which is highly resistant to reaction with slags which typically cover molten metal baths.

In accordance with the invention, there is provided a protective sheath for a temperature sensing device comprising a metal tube having one closed end to provide a cavity for the temperature sensing device and a series of protective layers comprising at least two cermet layers consisting essentially of $Al_2O_3$-$Cr_2O_3$-Mo covering the outer surface of the metal tube, the concentration of molybdenum in the cermet layers decreasing in proceeding from the inner to the outer layers, each of the cermet layers having a porosity of from about 4 percent to about 33 percent, and a ceramic layer of substantially pure $Al_2O_3$-$Cr_2O_3$ covering the outermost cermet layer, said ceramic layer having a porosity from about 4% to about 33%.

A protective sheath made in accordance with this invention is capable of withstanding severe thermal shock, and exhibits good resistance to corrosion and erosion by molten metals and consequently has a greatly increased lifetime compared to similar sheaths having a similar composition. It is believed that the increased service life is a result of the combination of the 4 to 33% porosity and the thermal mismatch of the ceramic and the metal. This combination produces a well-controlled microstructure which consists of very fine microcracks. It is theorized that these microcracks, which exist in the layers adjacent the metal substrate, absorb energy upon immersion of the cold unit into molten metal, thus enhancing the thermal shock resistance of the protective sheath.

BRIEF DESCRIPTION OF THE DRAWINGS

FIG. 1 is a sectional view of a thermocouple system having the protective sheath of this invention.

FIG. 2 is a sectional view showing details of the protective cermet and ceramic layers.

FIG. 3 shows a modification of the invention in which sacrificial layers are provided over the porous cermet and ceramic layers.

FIGS. 4 and 5 are sectional views of a protective sheath with a thermocouple in place.

FIG. 6 shows a thermocouple system in which an extension is provided for the protective sheath.

FIG. 7 shows a slag protective collar for a protective sheath.

DETAILED DESCRIPTION OF THE INVENTION

FIG. 1 is a sectional view of thermocouple assembly 10 which incorporates a protective sheath 11 which consists of metal tube 12 covered with graded protective coating 14 comprising a cermet and an outer layer of a ceramic. Tube 12 defines cavity 13 which contains thermocouple junction 54. Slag collar 40 is provided to protect the thermocouple sheath 11 against corrosive and erosive action of slag which typically floats on top of molten metal. Thermocouple wires 50, 52 interconnect terminal head 62 with thermocouple junction 54 and are held in place in sheath 11 by double bore insulator 38. Terminal head 62 is provided with seals, not shown, which may be conventional.

Metal Tube

The metal tube 12 is formed by methods known in the art from a metal or metal alloy which has the requisite properties of a high melting point and strength at high temperatures. Molybdenum is the metal of choice for use at extremely high temperatures in view of its excellent mechanical properties at elevated temperatures. In addition, the thermal conductivity and specific heat of the metal of the tube control the temperature rise in the interior of the tube and the result is a benign environment for the thermocouple assembly. Molybdenum containing minor amounts of titanium and zirconium may be used and has the advantage that its use results in a stronger tube than a tube made of pure molybdenum because the alloy tends to inhibit recrystallization at the temperatures of interest.

Tubes made of stainless steel are quite satisfactory for use in the sheath when temperatures of lower melting materials such as, for example aluminum, are to be measured. Stainless steel has a cost advantage when compared to molybdenum and in some instances may be the metal of choice for the tube for that reason.

Although, as noted above, metals other than molybdenum or molybdenum alloys may be used for the tube, in the following description the tube will be identified as a molybdenum tube. It is not intended that this should limit the invention, and persons skilled in the art will be able to substitute other suitable metals for molybdenum.

Graded Porous Layers

Although molybdenum has an extremely high melting temperature, it will dissolve in molten iron and steel, and therefore a protective coating must be used to separate the melt from the molybdenum tube. In accordance with the invention, the molybdenum is protected from the melt by a coating comprising a plurality of porous layers which are applied to the outer surface of the tube by an arc plasma spray process. A plasma arc spray process has been found to be particularly useful because it permits control of the critical parameters of surface structure and porosity of the layers.

It is common practice when applying ceramic coatings to substrates, such as those made of ceramic or metal, to match the coefficients of thermal expansion in order to minimize the thermal stresses arising from temperature changes which will weaken and ultimately destroy the coatings. Matching the coefficients of thermal expansion of the coatings with the substrate materials, however, severely limits the choice of materials which can be used for coatings. In the present invention, advantage is taken of the mismatches in thermal expansion between the ceramic and the molybdenum to produce a controlled thermal mechanical stress which induces very fine, well-controlled microcracking in the coating. This microcracking, which is represented in FIG. 2 by numeral 15, together with the proper amount of porosity in the coating layers results in a protective sheath having superior thermal shock resistance as well as excellent chemical durability in molten metals and slags.

The porous layers of a cermet comprising $Al_2O_3$-$Cr_2O_3$ and molybdenum may be applied directly to the outer surface of metal tube 12, which has preferably been grit-blasted to improve adhesion of the protective coating. However, in the preferred method of carrying out the invention, the outer surface of the metal tube 12 is first coated with a porous layer of molybdenum, formed from molybdenum powder as by arc plasma spraying the surface of tube 12.

The graded protective coating 14, illustrated in detail in FIG. 2, consists of a porous molybdenum bond coat 16, followed by porous cermet coats 18, 20, 22 which contain a mixture of $Al_2O_3$-$Cr_2O_3$ and molybdenum, with the molybdenum present in decreasing concentrations in proceeding from the inner to the outer surface.

The outer coat 24 is substantially 100 percent $Al_2O_3$-$Cr_2O_3$.

The $Al_2O_3$-$Cr_2O_3$ may suitably contain $Cr_2O_3$ in a concentration of from about 10 to about 30 mole percent, and the preferred $Al_2O_3$-$Cr_2O_3$ powder contains $Cr_2O_3$ in the amount of about 20 mole percent. The powder containing about 20 mole percent $Cr_2O_3$ has a thermal coefficient of expansion of about $8 \times 10^{-6}/C°$.

The molybdenum has a thermal coefficient of expansion of approximately $5.4 \times 10^{-6}/C°$ which results in a 45 percent difference in the thermal coefficients of expansion of the ceramic powder and the molybdenum.

While the $Al_2O_3$ and $Cr_2O_3$ may be prepared by mechanically blending $Al_2O_3$ and $Cr_2O_3$, the preferred material is a powder which has been formed by oxidizing an aluminum-chromium intermetallic compound.

In the preferred form of the protective sheath, the first porous layer which is adjacent the molybdenum substrate, is formed from molybdenum powder. Subsequent layers have a decreasing concentration of molybdenum and an increasing concentration of ceramic and the outer layer is 100% ceramic. While the extent of the changes made in the compositions in proceeding from one layer to another layer is not critical, in the preferred method of carrying out the invention, the change in the concentration of molybdenum is in a straight line weight percent relationship in proceeding from the inner to the outer layers.

While the number of layers of the cermet may range from 2 to 10 or more, and preferably from 3 to 9, little advantage is gained by going beyond about 5 layers and the cost of making the protective sheath increases with the number of layers used. In the preferred method of making the protective sheath the graded protective coating 14 consists of 5 layers starting with 100% molybdenum for the first layer, 75% molybdenum, 25% ceramic for the second layer, 50% molybdenum, 50% ceramic for the third layer, 25% molybdenum, 75% ceramic for the fourth layer, and 100% ceramic for the fifth layer.

The total thickness of the various layers may suitably range from about 0.024 to about 0.040 inch. In the preferred method of carrying out the invention the porous molybdenum layer adjacent the molybdenum tube and each successive porous cermet layer has a thickness from about 0.002 to 0.004 inch, and the outer ceramic coat has a thickness from about 0.015 to 0.025 inch. Very close control of the thicknesses of the various layers is not essential in order to produce a protective sheath which is resistant to thermal shock. However, in the preferred method of carrying out the invention, each of the layers of molybdenum and cermet has approximately the same thickness, for example about 0.003 inch.

It is essential that the cermet layers have a porosity from about 4 to about 33%. The preferred range for the porosity is from about 15 to 30 percent and the optimum is from about 20 to about 25 percent. While the function of the pores is not fully understood, it is believed that the pores accommodate the expansion of the material in the layers when subjected to a high temperature environment. The preferred method of achieving the desired porosity is by applying the molybdenum, cermet and ceramic layers by a plasma arc process.

The values for the porosity given herein are as determined by optical microscopy using standard stereological techniques.

Plasma Arc Coating Process

The degree of porosity of a metal, cermet or ceramic layer deposited in a plasma spray coating process primarily is determined by the magnitude of the process parameters of (1) power input to the arc, (2) powder feed rate, (3) the distance from and the angle to the substrate surface of the spray nozzle, and (4) the rate of traverse of the spray nozzle over the substrate surface.

The power input may suitably range from about 15 to about 45 kw, and the preferred level of power input is from about 30 to about 40 kw. A decrease in the power input results in an increase in the porosity of the coated layer.

The powder feed rate may be in the range from about 6 to about 10 pounds of powder per hour. A decrease in the powder feed rate decreases the porosity of the coated layer.

The spray nozzle is preferably held a distance of from about 2 to about 6 inches away from the substrate surface. The porosity of the coated layer increases with an increase in the distance between the spray nozzle and the substrate.

The angle that the sprayed particles makes with respect to a line perpendicular to the axis of the body being sprayed may be as great as about 30°; however, the preferred angle is about 0° to 10°. As the angle of impact is increased, the porosity increases.

The traverse rate of the spray nozzle along the substrate surface may suitably range from about 4 to about 12 inches per second. The porosity increases as the traverse rate increases. In the preferred method, the substrate is rotated as it is sprayed. A typical rate of rotation is about 600 revolutions per minute for a ½ inch diameter tubular substrate.

In carrying out the coating process, the substrate should be heated, preferably to a temperature in the range of about 200° F. to about 500° F. While changing the substrate temperature may change the degree of porosity to some degree, it appears to have a minor effect on the porosity.

The type and force rate of plasma gases also have little effect on controlling the degree of porosity. Useful gases are mixtures of nitrogen and hydrogen in a volume ratio of nitrogen to hydrogen of from about 4:1 to about 8:1. Typically useful flow rates are 2.5 to 5 standard cubic feet per minute for nitrogen and 0.3 to 0.6 cubic feet per unit for hydrogen.

Overcoating The Porous Layers

The outer layer of $Al_2O_3-Cr_2O_3$ is not wet by molten metals and therefore molten metals do not penetrate tiny cracks which may exist in the outer coating. However, the slag which typically floats on top of a molten metal can wet the outer ceramic layer and may penetrate even fine cracks or pores, and thus eventually cause failure of the protective sheath. Accordingly, in the preferred method of carrying out the invention, an outer layer of a high temperature material which will not be wet by the slag layer is applied as an overcoating. One such material which provides excellent protection for a sheath used in measuring the temperature of molten steel is boron nitride which provides an anti-wetting action which protects the sheath as it is lowered through the slag layer. The boron nitride may be applied by spraying an aqueous suspension of boron nitride onto the ceramic coat at room temperature. The coat is air-dried and then cured at a temperature of about 700° F. In the preferred method of applying a boron nitride overcoat, a plurality of thin coats is applied with air drying between each coat, and the final coated body is cured at a temperature of about 700° F. For example, five (5) coats, each 0.002 inch thick may be used to attain a total boron nitride coat thickness of 0.01 inch. Suitable aqueous suspensions of boron nitride containing an inorganic binder such as alumina, are commercially available.

For certain melts, such as melts of aluminum and aluminum alloys, the preferred coating is zircon ($ZrSiO_4$). The zircon coating may be applied in a manner similar to that of the application of a boron nitride coating.

Other useful coatings are those formed from either magnesium zirconate ($MgZrO_4$) or zirconia ($ZrO_2$). These coats may be applied by slurry-coating or spraying with a subsequent sintering step.

Sacrificial Layered Coating

In the preferred method of carrying out the invention, additional protection is provided for the protective sheath as formed above by applying alternating layers of $Al_2O_3-Cr_2O_3$ and boron nitride over the outer coating of the porous graded layers. As shown in FIG. 3, sacrificial overcoat 26 consists of boron nitride layers 28 and 32 which alternate with $Al_2O_3-Cr_2O_3$ layers 30, 34. The coats are applied by first spraying a suspension of boron nitride over the $Al_2O_3-Cr_2O_3$ topcoat to form a thin layer of boron nitride on the $Al_2O_3-Cr_2O_3$ layer. The boron nitride coat is air-dried and cured and then, a thin layer of $Al_2O_3-Cr_2O_3$ is plasma arc sprayed over the boron nitride. As discussed below, the boron nitride coat is treated to condition it so that the subsequent coat of plasma arc-sprayed $Al_2O_3-Cr_2O_3$ will adhere to it. This step is followed by applying another layer of boron nitride and another $Al_2O_3-Cr_2O_3$ coat. As many coats as deemed necessary can be added this way. The boron nitride apparently permits the adjacent ceramic layers to move longitudinally as they expand, producing slip plane effects which induce no major stresses in the adjacent ceramic layers. As the outer coats deteriorate due to their erosion in the melt, the inner coats assume the task of protection. This process continues until the sacrificial coat has worn away, and after the sacrificial layers are gone, the protective sheath still functions with its basic porous graded layers intact.

Other materials, such as $Al_2O_3-Cr_2O_3$ do not adhere well to a substrate of boron nitride unless the boron nitride layer has been treated to increase adherance between the layers. In one such treatment, the layer of boron nitride is provided with a layer of wet boron nitride and $Al_2O_3-Cr_2O_3$ powder is brushed onto the wet boron nitride layer. $Al_2O_3-Cr_2O_3$ is then plasma arc sprayed onto the resulting substrate. This procedure may be followed to coat each layer of $Al_2O_3-Cr_2O_3$ onto a boron nitride layer.

The technique described above results in a system which can withstand long immersions because it provides protection to the graded coats. The sacrificial layer protection is especially useful when the temperature measurement of a melt requires many successive immersions.

Protective Inner Lining

The life of a thermocouple probe can be extended even further by lining the interior of the metal tube with a closed-end ceramic tube and installing the thermocouple inside the ceramic tube. The advantage of this structure is the protection afforded the thermocouple even if the melt reaches and attacks the inner metal tube. While the ceramic tube will not withstand rough handling or additional immersions due to direct thermal shock after the inner metal tube dissolves in the melt, it can survive for long periods in certain melts.

Extension System

When it is necessary to insert the thermocouple assembly in a melt to a considerable depth, the problem arises of thermal damage to the electrical and structural members. The inner metal tube must be long enough to reach from the measurement point to the surface of the liquid melt, and one solution is to make the inner metal tube longer. For molybdenum this is impractical both from a structural strength and a cost point of view. However, an extension system may be used to carry the connections to the thermocouple and provide supporting structure to a zone above the melt surface. Such an extension system, while it may not be able to survive the temperatures existing in the metal melt, may be capable of withstanding submergene in the slag layer. In a typical extension system as shown in FIG. 6, a stainless steel tube 72 of the same diameter as the molybdenum tube 12 is mechanically coupled by coupling 73 to the molybdenum tube. However, some softening will occur if the stainless steel tube itself approaches the temperature of the melt. Additional structure is therefore provided to strengthen the structure. The extension may be strengthened by providing a metal or ceramic casing 70 as a supporting structure which provides both structural strength and thermal protection for the extension tube 72. The large cross-sectional area of the casing 70 provides a cooling path for heat to escape upwardly and thus moderate the environment for the stainless steel extension tube.

Slag Collar

As shown in FIG. 6, slag collar 40 is provided to protect the steel members from the slag layer and from the excessive heat near the slag-metal interface. The slag collar 40 may suitably be made from $Al_2O_3$ or MgO, and the preferred material for the slag collar is MgO.

The collar is preferably formed by coating it in a rectangular shape with the form horizontal. The horizontal orientation for the slag collar during casting has the advantage that it is possible to compact the material by vibration or other methods of agitation much more effectively than is ordinarily achieved with the form oriented verticaly. As a result the curing is much more uniform.

In the preferred method of making the collar, zig-zag shaped steel rods 42 are provided to reinforce the collar. The zig-zag shape of the rods eliminates a problem arising from the differential thermal expansion between the metal reinforcement and the material of the collar. The zig-zag reinforcing rods are preferably attached by welding to the inner end of casing 70.

In the preferred method of forming the slag collar, metal needles 44, such as steel needles, which may, for example, be about one inch long and about 0.03 inch thick, are dispersed throughout the collar. These needles are distributed throughout the casting during the form-loading process and provide reinforcement to the collar 40 in all directions.

In the embodiment shown in FIG. 6, a small metal tube 63 is inserted inside the casing 70 to the junction of the molybdenum tube 12 and the steel extension tube 72. It is thus possible to introduce a small flow of an inert gas such as argon into that zone. The inert gas is heated by the hot structure at the junction of tubes 12 and 72 and thereby reduces the temperature for enhanced strength in the critical structural area. An auxiliary thermocouple 66 having loads 68 is placed near the junction of the molybdenum tube and extension tube and it is thus possible to monitor the structure temperature and thereby control the flow of inert gas to achieve the proper amount of cooling. It is important that the temperature in this zone not be lowered any more than is necessary to preserve the integrity of the structure because excessive cooling will cause a freeze-up of slag around the collar which would result in additional loads on the structure. An acceptable temperature for this zone is about 100° F. below the softening temperature of the metal used for the casing 70.

FIG. 7 shows another method of providing structural strength and slag protection for the extension tube. The outer shell is an alumina-graphite sleeve 80 with an inner diameter of approximately 1¼ inches and an outer diameter of approximately 2½ inches. The thermocouple protective sheath 11 is mounted in the sleeve 80 with approximately 3 inches of the sheath protruding from the lower end. A section of ¾ inch pipe 81 is slipped over the stainless steel extension 72 and clamped with a compression fitting 73. The ¾ inch pipe 81 is cemented in place with a high temperature mortar such as magnesia or alumina-chrome. The annular space between sleeve 80 and protective sheath 11 or extension 72 is filled with an alumina castable. The lower end of the sleeve is sealed with a ¼ inch layer of magnesium oxide 84.

Thermocouple

In one method of carrying out the invention as shown in FIG. 4, the thermocouple junction 54 is suspended in cavity 13 and heated by radiation from the surrounding walls. This arrangement has the advantage of simplicity of assembly; however, there is the disadvantage that the radiation coupling provides a relatively slow transfer of heat to the junction, and the response time is typically several minutes. In another embodiment of the invention, as shown in FIG. 5, the thermocouple is encapsulated in ceramic adhesive 58 and subsequently bonded to the end walls of the molybdenum tube with a heat conductive high temperature body 60 which is preferably a cermet. In the embodiment shown in FIG. 5, the response time is typically less than a minute.

Having thus described the invention, the following Examples are offered to illustrate it in more detail.

Example 1

A thin-walled molybdenum tube ½ inch in diameter and 12 inches long is cleaned, degreased and its outer surface is grit-blasted with powdered alumina. The resulting tube, which is ready for coating, is preheated to a temperature of about 300° F. and, while rotating at 600 RPM, is plasma arc sprayed with molybdenum powder to form a porous layer 0.003 inch thick. The spraying is accomplished by feeding molybdenum powder at a rate of 8 pounds per hour into an arc formed from a mixture of 85% nitrogen and 15% hydrogen and having a power input of 35 kw. The spray nozzle is held 4 inches from the outer surface of the rotating tube and moved parallel to the axis of the tube at a rate of 8 inches per second. The nozzle is held at such an angle that the molten particles of molybdenum strike the outer surface of the tube at an angle of 10° from a line perpendicular to its axis.

The resulting porous molybdenum-coated tube is reheated to a temperature of 300° F. and is sprayed to form a porous cermet layer on top of the porous molybdenum layer using as a feed a powder consisting of 75% by weight of molybdenum and 25% by weight of $Al_2O_3$–$Cr_2O_3$. The mole ratio of $Al_2O_3$ to $Cr_2O_3$ is 4:1.

A layer 0.003 inch thick consisting of 50 weight percent molybdenum, 50 weight percent $Al_2O_3$–$Cr_2O$, followed by a layer 0.003 inch thick of 25% molybdenum and 75% $Al_2O_3$–$Cr_2$ and then a 0.020 inch thick layer of substantially pure $Al_2O_3$–$Cr_2$ are plasma arc-sprayed onto the rotating tube under conditions substantially the same as those used to form the preceding porous layers. The tube was reheated to 300° F. between each coating step.

Each porous layer has a porosity in the range of 20 to 25%.

The foregoing Example is offered to illustrate a method of making a protective sheath for a thermocouple in accordance with the invention.

EXAMPLE 2

The protective sheath formed in Example 1 is given a protective outercoat by spraying onto it a slurry containing boron nitride. The sprayed coat is air-dried and then cured at a temperature of 700° F. to produce a boron nitride coat 0.002 inch thick. Four additional coats are applied, air dried, and cured at 700° F. to form a total thickness of boron nitride of 0.01 inch.

This Example illustrates a method of forming a protective sheath which is resistant to attack by slag.

EXAMPLE 3

The boron nitride-coated protective sheath formed in Example 2 is conditioned by spraying onto it a slurry containing boron nitride and then applying dry $Al_2O_3$–$Cr_2O_3$ powder to the wet surface. The resulting sheath is then coated with a porous layer of $Al_2O_3$–$Cr_2O_3$ 0.002 inch thick using the same plasma arc spraying conditions that were used in Example 1 to form a cermet layer. Boron nitride is then coated onto the resulting $Al_2O_3$–$Cr_2O_3$ using the procedures for coating boron nitride which are described in Example 2. Three additional layers alternating between boron nitride and porous $Al_2O_3$–$Cr_2O_3$ are applied with boron nitride being the outermost layer.

This Example illustrates a method of forming a sacrificial layer in accordance with the invention.

What is claimed is:

1. A method of making a protective sheath for a thermocouple comprising:
    (a) providing a metal tube having one end closed;
    (b) plasma arc-spraying a layer of molybdenum over the outer surface of said metal tube under conditions to produce a coating of molybdenum having a porosity of from about 4 to about 33%;
    (c) plasma arc-spraying a series of at least two layers of a cermet comprising $Al_2O_3$–$Cr_2O_3$–Mo on the resulting porous molybdenum-coated metal tube, the concentration of molybdenum in each cermet layer decreasing in proceeding from the inner to the outer layer, the plasma arc spraying conditions being controlled to produce a porosity of from about 4 to about 33% in said cermet layers;
    (d) plasma arc spraying a coating of substantially pure $Al_2O_3$–$Cr_2O_3$ on the outermost cermet layer, applied in step (c) under conditions to produce an $Al_2O_3$–$Cr_2O_3$ layer having a porosity of from about 4 to about 33%.

2. A process according to claim 1 in which from 3 to 9 layers of the $Al_2O_3$–$Cr_2O_3$–Mo cermet are plasma arc-sprayed over said layer of porous molybdenum.

* * * * *

UNITED STATES PATENT AND TRADEMARK OFFICE
CERTIFICATE OF CORRECTION

PATENT NO. : 4,746,534

DATED : May 24, 1988

INVENTOR(S) : R. Michael Phillippi, David C. Greenspan, Richard T. Ellis, Tadeusz M. Drzewiecki, Taki Negas, Ernie Tokay and James R. Bush It is certified that error appears in the above-identified patent and that said Letters Patent is hereby corrected as shown below:

Column 4 Line 13 "$Cr_{21}O_3$" should read --$Cr_2O_3$--.

Column 6 Line 61 after "layer" insert --outer--.

Column 7 Line 23 "submergene" should read --submergence--.

Column 7 Line 52 "verticaly" should read --vertically--.

Column 8 Line 9 "loads" should read --leads--.

Column 8 Line 35 "1/4" should read --1/2--.

Column 9 should be single spaced not double spaced.

Column 9 Line 15 "$Al_2O_3\text{-}Cr_2O$" should read --$Al_2O_3\text{-}Cr_2O_3$--.

Signed and Sealed this

Fourteenth Day of February, 1989

Attest:

DONALD J. QUIGG

Attesting Officer

Commissioner of Patents and Trademarks